United States Patent [19]

Bandy et al.

[11] Patent Number: 4,504,873

[45] Date of Patent: Mar. 12, 1985

[54] IDENTIFICATION FIELD SCAN APPARATUS

[75] Inventors: Peter B. Bandy, Pine Island; John A. Danen; Nyles N. Heise, both of Rochester; Donald C. Holtan, Pine Island, all of Minn.

[73] Assignee: International Business Machines Corporation, Armonk, N.Y.

[21] Appl. No.: 482,099

[22] Filed: Apr. 4, 1983

[51] Int. Cl.³ .............................................. G11B 5/012
[52] U.S. Cl. ...................................... 360/63; 360/135
[58] Field of Search .................... 360/48, 63, 72.2, 98, 360/133, 135; 369/34, 36, 41

[56] References Cited

U.S. PATENT DOCUMENTS 4,016,603  4/1977  Ottesen .............................. 360/135
4,163,265  7/1979  van Herk et al. .................... 360/77

Primary Examiner—George G. Stellar
Attorney, Agent, or Firm—Robert W. Lahtinen

[57] ABSTRACT

A multiple transducer disk file format and head addressing/switching control circuitry is shown and described which permits reading all sector identifier (ID) fields during a single rotation of the media using uniformly staggered sectors. This results in an average access latency of one-half revolution of the media and enables the use of maximum or selectively reduced data rates secured by successively storing data in sectors separated by sector fractions which are multiples of the uniform staggering between sectors within a cylinder.

8 Claims, 4 Drawing Figures

| TRACK NO. | INDEX |
|---|---|
| 0 | 43 44 45 46 47 48 49 0 1 2 3 4 5 6 7 8 9 10 11 12 13 14 15 16 17 18 19 |
| 1 | 99 50 51 |
| 2 | 149 100 101 102 |
| 3 | 199 150 151 152 153 |
| 4 | 249 200 202 |
| 5 | 299 250 |
| 6 | 349 300 302 303 |
| 7 | 399 350 |
| 8 | 449 400 |
| 9 | 499 450 453 |
| 10 | 549 500 |
| 11 | 599 550 |
| 12 | 649 600 |
| 13 | 699 650 |

TYPICAL SECTOR FORMAT

IDENTIFICATION FIELD SCAN APPARATUS

BACKGROUND OF THE INVENTION

This invention pertains to direct access disk storage devices and more particularly to a format and mode of operation that enables all sector ID fields in a cylinder to be read in a single revolution.

A disk file is most commonly operated in a physical mode wherein a track is read continuously sector by sector in sequence. A second mode of operation is a logical mode wherein the sectors within a cylinder are staggered in a mount 1/n of a sector wherein N is the number of tracks forming the cylinder. By writing one sector and thereafter switching to the head which will encounter the sector spaced 1/n sectors from the terminal end of such one sector, successive sectors may be written in a manner which permits the intersector gap to be reduced in length. This derives from the ability to switch from writing (in the data sector portion) to the reading of the next subsequent ID sector portion without having to enlarge the gap between such sector portions to accommodate the write signal decay. This procedure produces the maximum data rate which accommodates both write and read functions.

SUMMARY OF THE INVENTION

Using the uniformly staggered sector format, an ID scan mode of operation permits the ID or identifier sector portions of a sector for each track to be read during the passage of a single sector arcuate length past the head assembly. By continuing and repeating this process during the passage of each arc equivalent to a sector, all the sector ID's are read during a single revolution of the disk assembly. This mode of operation not only permits all ID fields to be read in a single revolution, but also affords enough time between successive comparisons of an address to an ID field to permit a mode change to physical mode when a desired sector ID is identified. This permits the data to be read immediately and results in an average delay or latency of one-half revolution when seeking a sector within a cylinder and a maximum delay of one full revolution.

This sector staggering format also permits the data rate of the file to be tailored to any slower data rate by selecting as the logical sequence the head and sector with the proper intersector delay to the nearest 1/n sector time.

DETAILED DESCRIPTION

Figure 2:
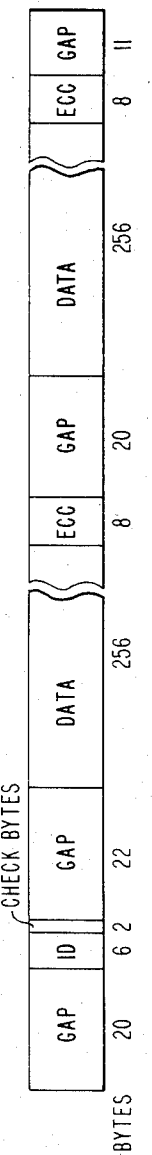
FIG. 2 shows schematically the format of a typical magnetic disk data sector including the gaps, ID and data fields and the checking and error correction bytes.

The invention is shown in the environment of a disk drive that has a dedicated servo surface and 14 heads mounted on a single actuator, which in combination with a multi disk media assembly that rotates in unison defines a single cylinder of 14 tracks. A typical sector format is shown in FIG. 2 which includes an initial gap of 20 bytes duration, a 6 byte identifier (ID) field, a 2 byte check field and a gap of 22 bytes. The data portion of the data sector has two 256 byte data fields separated by an 8 byte error correction field and a 20 byte gap and followed by an 8 byte error correction field and an 11 byte gap to complete the sector.

Figure 1:
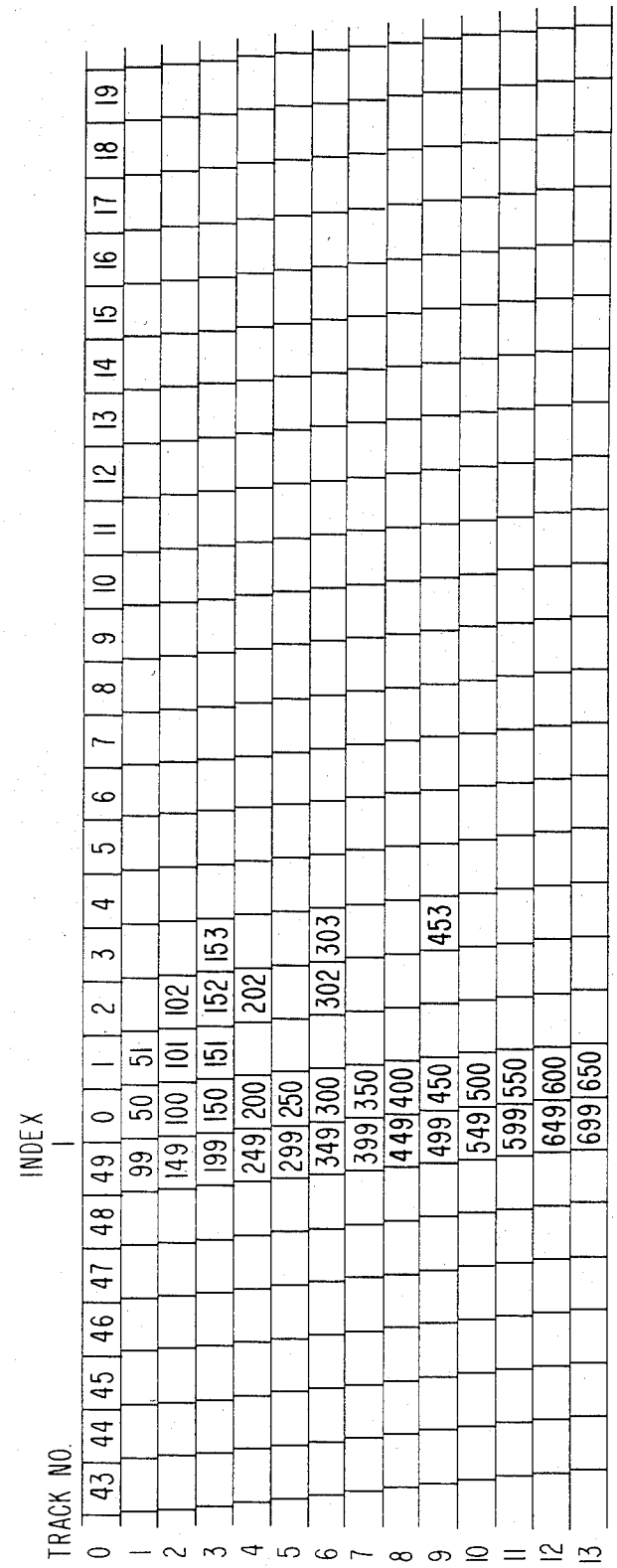
FIG. 1 is a partial schematic showing of a series of partial data tracks forming a cylinder showing, in linear form, the uniform offset of the sectors within the circular tracks.

As shown in FIG. 1, the sectors are uniformly staggered by one-fourteenth sector between successively staggered sectors. In the format of the 609 byte sector of FIG. 1, this causes successively staggered sectors to be displaced by 43 and one-half bytes.

Figure 3A:
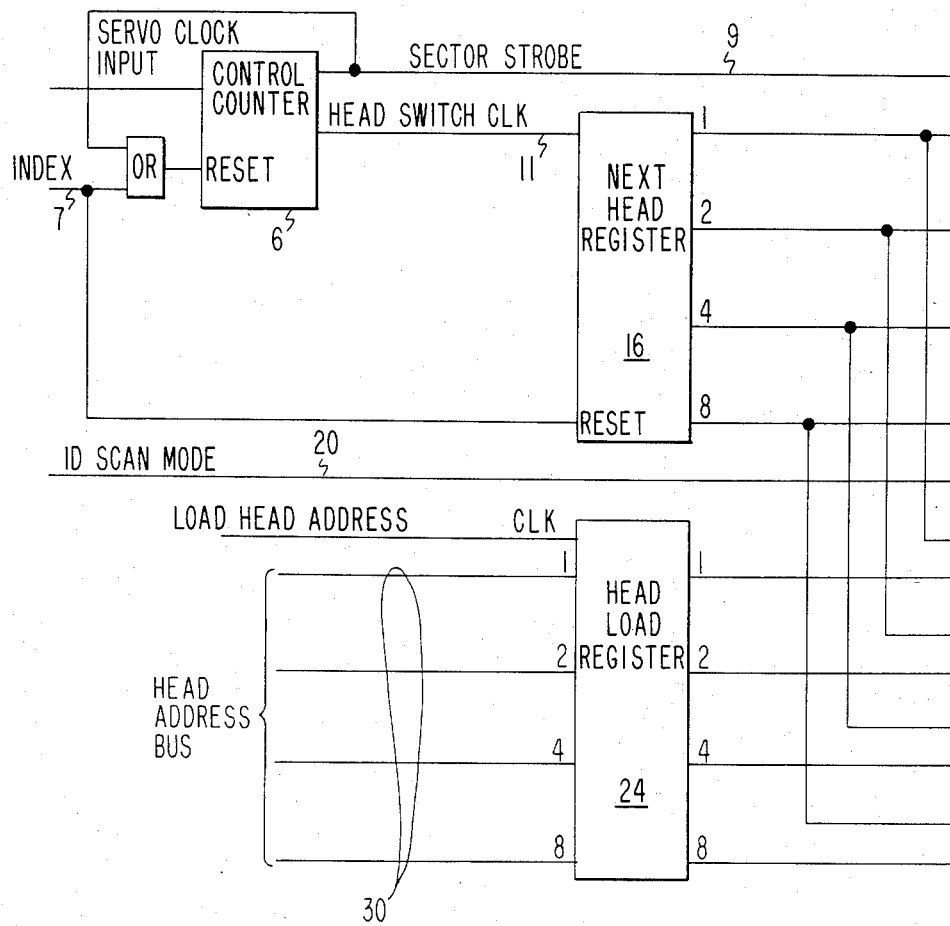
FIGS. 3A and 3B shows the circuit used to control head addressing or switching during ID scan and physical read modes.
Figure 3B:
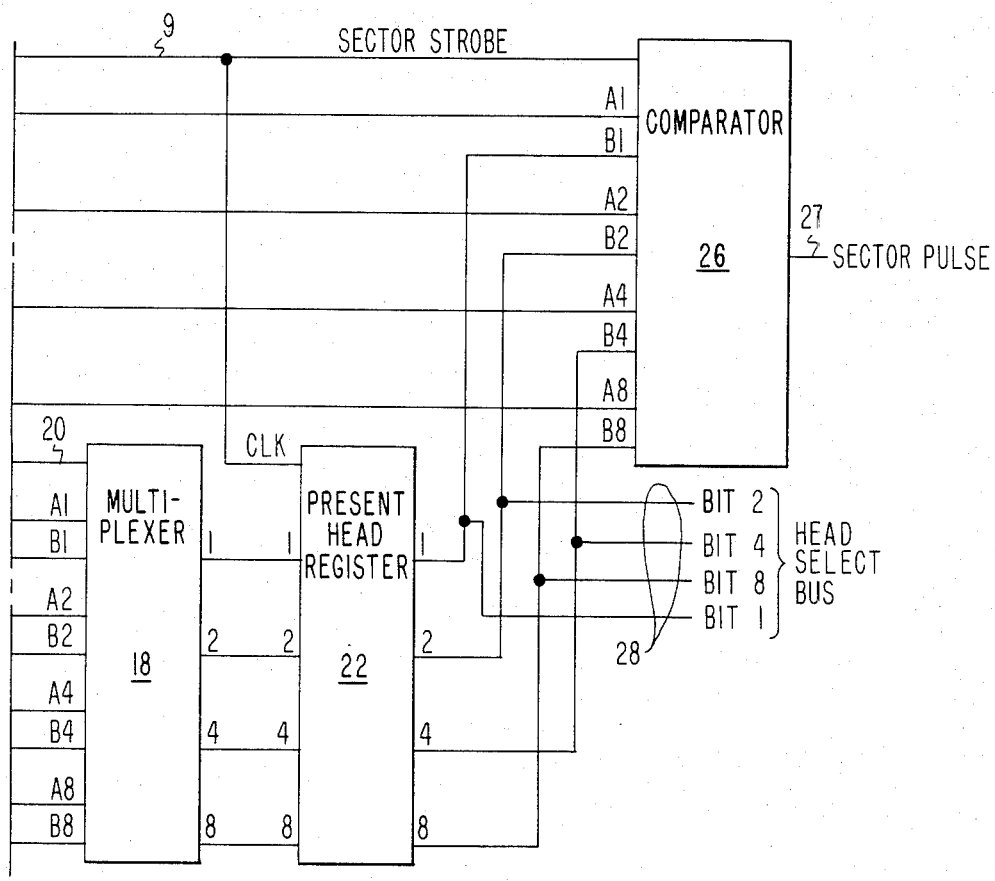

FIGS. 3A and 3B illustrate the control circuit that controls the head select in the physical mode wherein a single track is read continuously or the scan mode in which all ID fields are read during a single revolution of the media assembly.

The control counter 6 is set to ∅ by the index mark signal which indicates the beginning of sector ∅, track ∅. The index mark signal on line 7 also sets the next head register to head ∅. The counter 6 functions to count to 43½ bytes and reset to ∅. Counter 6 receives a pulse train from the servo clock which generates 1 pulse for each 1½ bytes of the data sectors. Accordingly, counter 6 decodes a count of 29 to provide a 1 count pulse on sector strobe line 9 and also reset the counter to ∅. Also decoded by the counter is a count of 24 on line 11 which advances the count in the next head register 16. Multiplexer 18 functions in accordance with the condition of ID scan line 20 to load the present head register with the content of either the next head register 16 (when the ID scan mode line 20 is active) or the head load register 24 (when the ID scan mode line 20 is inactive). The selected content of multiplexer 18 is gated to present head register 22 by the sector strobe pulse on line 9. If the present head register 22 is loaded with the content of the next head register 16, both register 16 and 22 contain the same head address and a compare occurs at comparator 26 causing a sector pulse output on line 27 during the sector strobe pulse. The content of the present head register 22 is also available on the head select bus 28.

To operate in scan mode with the ID scan line 20 active, the value in the next head register 16 is loaded to the present head register 22 each time a sector strobe signal on line 9 occurs. This enables an ID field on each track to be read during each sector time and all ID fields to be read during a single revolution of the media. To function in physical mode, the ID scan mode line 20 is inactive causing the content of the head load register 24 to be gated into the present head register 22. The same track location will then continuously appear on the head select bus 28 to make such head continuously active, as long as a new address on bus 30 is not gated by a signal on the load head address line and the ID scan mode select line remains inactive. It will also be noted that under such conditions the sector pulse from comparator 26 will occur only at the beginning of the sectors corresponding to the track associated with the head indicated on the head select bus 28.

The sector format which enables the ID scan mode to read all ID fields during a single revolution may also be utilized in a logical mode to permit a data rate that is reduced by one-fourteenth increments in the illustrated embodiment of a 14 head device. Referring to FIG. 1, the fastest reading data rate is continuous sectors on a single track such as numbered sectors ∅, 1, 2, 3. When writing, the fastest rate is obtained through switching heads in a sequence such as sectors Ø, 51, 102, 153 to enable minimizing the intersector gaps. Progressively reduced data rates can be obtained by sector sequences such as Ø, 101, 202, 303 and Ø, 151, 302, 453.

We claim as our invention:

1. A multiple transducer data storage device having plural media surfaces that rotate in unison and present multiple circular data tracks respectively associated with said multiple transducers to form a cylinder at a particular location of a transducer carriage access device with data stored on such data tracks in sectors comprising formatting the data tracks within said cylinder with each sector circumferentially offset from every other sector within said cylinder;

said offset portion of each sector occurring at the leading portion of said sector and including the sector identifier (ID) field of the sector; and circuit means for switching sequentially among said transducer heads to read each next occurring offset sector portion in sequence, whereby all of said ID fields are read during a single revolution of said media.

2. The data storage device of claim 1 wherein said sectors contain a uniform number of bytes and said sectors are uniformly staggered by an amount equal to the number of bytes included in a sector divided by the number of transducers.

3. The data storage device of claim 2 wherein the staggered portion of the sector includes a gap portion subsequent to said ID field and said device further comprises read mode switching circuit means which permits continuance of the ID scan mode of reading each next occurring offset sector portion until a desired ID field is recognized whereupon the read mode operation is changed to cause the data field of the sector in which the ID was recognized.

4. The data storage device of claim 3 wherein the logical mode in which sectors are stored within said cylinder are separated by circumferential fractions of sectors to establish a predetermined data rate that is less than the maximum data rate obtained by reading sequential sectors in a single track, such fractions being multiples of said uniformly staggered portion.

5. The data storage device of claim 3 wherein said media comprises a plurality of magnetic disks mounted for unitary rotation about a common axis.

6. A data recording device for substantially continuously reading and/or writing data on tracks of a magnetic disk recording medium, comprising at least one rotatable magnetic disk recording medium, each having at least one recording surface with a series of concentric magnetic tracks, a plurality of one through n magnetic heads supported by a single actuator assembly with each head being respectively supported in data transducing relation to one through n of said magnetic tracks, each said magnetic track being formed as a series of sectors with each such sector having an identification (ID) portion and a data portion, the starting location of sectors on tracks one through n being angularly displaced from one another to enable a continuing ID read sequence wherein the ID sector portion of a track one sector is read followed sequentially by the reading of an ID sector portion on each track in sequence through track n followed by the ID sector portion of the next sequential ID sector portion on track one, and means for switching access among said one through n magnetic heads sequentially during the angular rotation of one sector past said magnetic heads and repeating the sequential switching of said magnetic heads during each succeeding one sector angular rotation, whereby all sector ID field portions of said one through n tracks are read during a single revolution of said rotatable magnetic disk recording medium.

7. The data recording device of claim 6 wherein said sector starting locations are uniformly displaced from one another by an amount equivalent to the number of bytes within a single sector divided by n, the number of magnetic heads.

8. The data recording device of claim 7 wherein said ID sector portion occurs within said uniformly displaced portion followed by a gap and said device further comprises read mode switching circuit means which permits reading sequential offset portions until a desired ID field is recognized whereupon the read mode operation is changed to read the data portion of the sector in which the ID field was recognized.

* * * * *